324-77

SEARCH ROOM

AUTOMATIC WAVE ANALYZER

Filed Nov. 20, 1958

INVENTOR.
LAURIE R. BURROW

BY Walter J. Jason
ATTORNEY

United States Patent Office 3,018,439

Patented Jan. 23, 1962

3,018,439

AUTOMATIC WAVE ANALYZER

Laurie R. Burrow, Fort Worth, Tex., assignor to General Dynamics Corporation, San Diego, Calif., a corporation of Delaware Filed Nov. 20, 1958, Ser. No. 775,317

5 Claims. (Cl. 324—77)

This invention relates to wave analyzers, and more particularly to an electronic wave analyzer for determining the frequency and amplitude of the components of a complex wave.

Wave analyzers heretofore known to the art have generally been of the heterodyne type wherein the wave to be analyzed is combined in a balanced mixer with the signal from an accurate stable tuneable oscillator. The output of the mixer passes through a highly selective tuned amplifier, tuned to a frequency that is higher than any of the frequencies contained in the unknown wave. The output from the tuned amplifier is applied to a suitable amplitude indicator. The frequency of the local oscillator is adjusted so that the difference frequency between the local oscillator frequency and the component of the unknown waveform is equal to the resonant frequency of the tuned amplifier. Each component frequency of the unknown waveform is obtained individually by having its frequency transformed to that of the tuned amplifier as the tuneable oscillator is varied, and the amplitude thereof displayed on the amplitude indicator.

These wave analyzers heretofore known have imposed severe restrictions on the tuneable local oscillator. Highly stable, drift-free tuneable oscillators have been required, and provision must be made for extremely accurate tuning, requiring an expanded scale, thereby introducing backlash problems. As a result, the local oscillator employed in such prior art wave analyzers have been bulky, inconvenient to operate, and extremely expensive.

The present invention eliminates the shortcomings of the heretofore known wave analyzers. In place of the highly accurate, stable, tuneable local oscillator with its associated problems as set forth hereinabove, the present invention employs an accurate fixed tuned local oscillator which produces a signal at the frequency to which the selective amplifier or filter is tuned. While the present invention employs a variable frequency oscillator, the frequency stability, drift, and tuning requirements are so relaxed as to enable employment of any general purpose oscillator of the proper frequency range. Since such widely used, conventional oscillators are designed to cover a broad band of frequencies, their tuning scales permit adequate reading and frequency setting accuracy. The normal stability of such oscillators is adequate for use in connection with this invention, they are simple to operate, and are relatively inexpensive to build.

It is, therefore, an object of this invention to provide a wave analyzer for accurately measuring the frequency and amplitude of the components of a complex wave.

Another object of this invention is to provide a highly accurate wave analyzer capable of analyzing the components of a signal corresponding to complex mechanical vibrations.

Another object of this invention is to provide a wave analyzer capable of measuring very low frequency components of a complex wave.

Another object of this invention is to provide a wave analyzer which does not require a precision variable high frequency local oscillator.

Another object of this invention is to provide a wave analyzer which is highly accurate, simple and rapid in operation, reliable, compact, and inexpensive to build.

These and other objects and features of this invention will become apparent from the following description and accompanying drawings, wherein.

Figure 1:
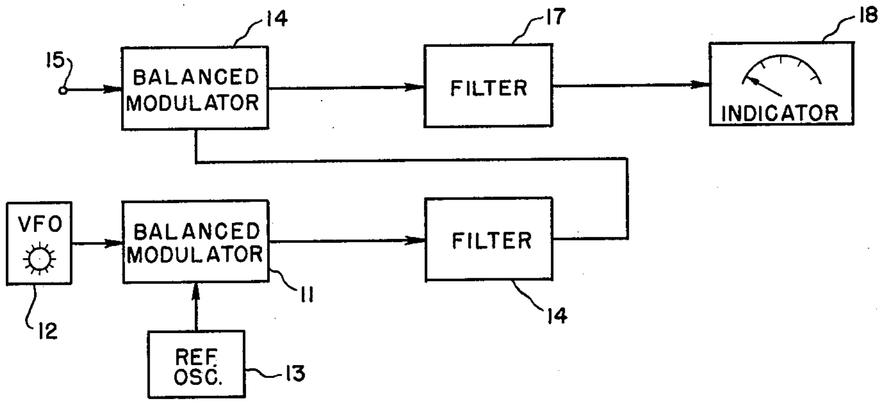
FIGURE 1 illustrates one embodiment of this invention.

Referring now to FIGURE 1, the input terminals of a first balanced modulator 11 are connected to the output terminals of a tuneable low frequency oscillator 12, and a stable, fixed high frequency reference oscillator 13. Output signals from balanced modulator 11 are applied to the input of a first filter 14. Filter 14 may be a high pass filter or a band pass filter, as further disclosed in detail hereinbelow.

A complex electrical signal to be analyzed is applied to input terminal 15. Second balanced modulator 16 has one signal input terminal connected to input terminal 15, and a second input terminal to the output of filter 14. A second filter 17, which is preferably in the form of a fixed tuned amplifier tuned to the same frequency as high frequency reference oscillator 13, is connected to the output of balanced modulator 17. An alternating voltage indicator 18, which may conveniently be a vacuum tube voltmeter, is connected to the output of filter 17.

The complex electrical signal to be analyzed is applied to one input of balanced modulator 16 through input terminal 15. Exemplarily, such a signal may be provided by a vibration transducer fastened to a vibrating body, or by a microphone exposed to a source of sound. A variable frequency signal from low frequency variable frequency oscillator 12 is applied to one input terminal of balanced modulator 11, and a fixed frequency signal from reference oscillator 13 is applied to the other input terminal of balanced modulator 11. Exemplarily, reference oscillator 13 may conveniently be a tuning fork oscillator of a type well known to those skilled in the art, providing an output signal at a frequency of, exemplarily, 500 cycles per second. Variable frequency oscillator 12 may conveniently be a resistance-capacitance tuned oscillator with a frequency range extending from exemplarily, one-half cycle per second to several hundred c.p.s. Such an oscillator is disclosed in "Electronics," volume 21, No. 9, September 1948, on pages 108 and 109.

Balanced modulator 11, when excited by variable frequency oscillator 12 and reference oscillator 13, furnishes a plurality of output signals, as is well known to the art. Assuming variable frequency oscillator 12 provides a signal at ten cycles per second, and reference oscillator 13 provides a signal at a frequency of 500 cycles per second, balanced modulator 11 will provide output signals at the sum frequency of 510 c.p.s., the difference frequency of 490 c.p.s., and the low modulating frequency of 10 c.p.s. As is well known to the art, a balanced modulator inherently suppresses the carrier frequency of 500 c.p.s. Filter 14 is tuned to eliminate the lower side band frequency of 490 c.p.s. and the modulating signal of 10 c.p.s. passing only the upper side band frequency of 510 c.p.s.

The 510 c.p.s. output signal from filter 14 is applied to one input terminal of balanced modulator 16. The complex signal to be analyzed is connected to the other input terminal of balanced modulator 16. Assuming that one of the frequency components of the complex signal is 10 c.p.s., it will be apparent that the output signal from balanced modulator 16 will include frequencies of 10, 500 and 520 c.p.s. These are applied to filter 17, which is tuned to accept only 500 c.p.s. The 500 c.p.s. signal is then applied to indicator 18, wherein the amplitude of the 500 c.p.s. signal is measured and displayed. It will be seen, therefore, that as the frequency of the variable frequency oscillator 12 is varied, an output indication is presented on indicator 18 when the signal from the variable frequency oscillator is identical to a component of the complex signal. The frequency of the component may then be read from the dial of the variable frequency oscillator, and the amplitude of the component is indicated on indicator 18.

Figure 2:
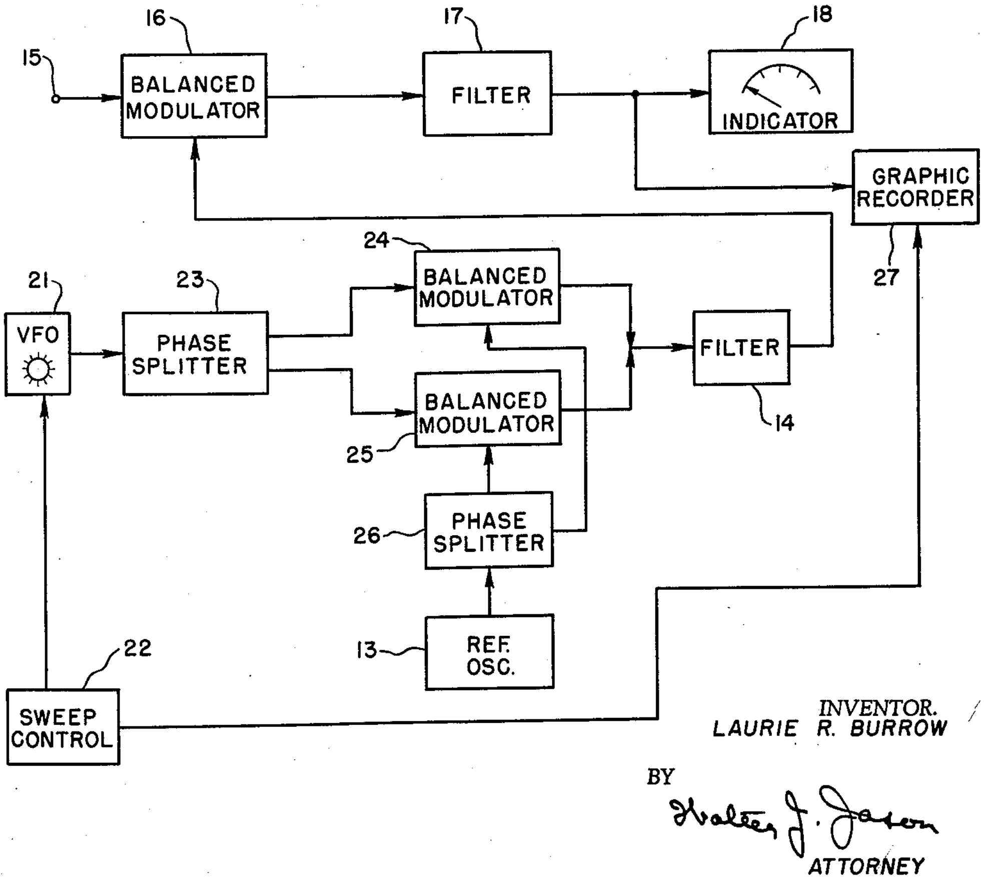
FIGURE 2 illustrates a second embodiment of this invention.

The embodiment of this invention illustrated in FIGURE 2 is similar in principle to the embodiment of FIGURE 1, disclosed hereinabove. Input terminal 15, balanced modulator 16, filter 17, indicator 18, filter 14, and reference oscillator 13 in FIGURE 2 are similar to the like designated elements in FIGURE 1. Variable frequency oscillator 21 in FIGURE 2 is substantially similar to variable frequency oscillator 12 in FIGURE 1, additionally including, however, a sweep control circuit 22 and sweep means, not shown, associated with oscillator 21 to automatically sweep the frequency of the output signal through the desired range. This may be done, exemplarily, by suitably connecting a motor to rotate the frequency determining element in a manner well known to the art.

The varying frequency output signal from variable frequency oscillator 21 is connected to a phase splitter 23. Two signals of the same frequency as produced by variable frequency oscillator 21, but 90 degrees out of phase with one another are present on the output terminals of phase splitter 23. A first output terminal of phase splitter 23 is connected to one input terminal of balanced modulator 24, and the second output terminal of phase splitter 23 is connected to one input terminal of balanced modulator 25. The fixed frequency signal from reference oscillator 13 is connected to phase splitter 26. Phase splitter 26 provides two output signals displaced 90 degrees in phase from one another at the frequency of reference oscillator 26. A first output signal from phase splitter 26 is applied to the second input terminal of balanced modulator 24, and the second output signal is applied to the second input terminal of balanced modulator 25. Output signals from balanced modulators 24 and 25 are applied to high pass filter 14.

In a manner similar to that disclosed hereinabove in connection with FIGURE 1, the complex signal from terminal 15, and the signal from filter 14 are connected to input terminals of balanced modulator 16. The output of balanced modulator 16 is connected to the input of filter 17, and the output of filter 17 is connected to indicator 18.

Means for automatically recording the frequency and amplitude of the components of the complex input signal applied to terminal 15 are also illustrated in FIGURE 2. A graphic record 27, which may conveniently be one of the X—Y type disclosed on pages 176—178 of "Standard Handbook for Electrical Engineers," edited by A. E. Knowlton and published in 1949 by McGraw-Hill Book Company, provides an indication of frequency along the X axis, and of amplitude along the Y axis.

Low frequency variable frequency oscillator 21 is swept through the desired frequency band by sweep control 22, which also provides a frequency proportional voltage to the X axis terminal of X—Y graphic recorder 27. Assuming the same frequency relations set forth hereinabove in connection with FIGURE 1, variable frequency oscillator 21 produces a signal at, exemplarily, 10 cycles per second at some instant. This 10 c.p.s. signal is applied to phase splitter 23. Two 10 c.p.s. signals, which are 90 degrees out of phase with one another are produced at the output terminals of phase splitter 23. In a similar manner, the fixed reference oscillator 13 furnishes a 500 cycle per second signal to phase splitter 26. Two 500 c.p.s. output signals displaced 90 degrees in phase are obtained from phase splitter 26, and are applied to the second input terminals of balanced modulators 24 and 25.

Each of balanced modulators 24 and 25 provide output signals which include the sum and difference frequencies of the reference oscillator and variable frequency oscillator frequencies, and the variable frequency oscillator frequency. Thus, both of balanced modulators 24 and 25 provide output signals at 510 c.p.s., 490 c.p.s., and 10 c.p.s However, the signals from balanced modulator 24 are displaced 90 degrees from the signals from balanced modulator 25. The output signals from balanced modulators 24 and 25 are combined. As is well known in the art, when the outputs of two balanced modulators are so combined, one side band frequency is cancelled out and the other is accentuated. Therefore, by proper choice of the phase relationships, the 490 c.p.s. signal is eliminated, and the 510 c.p.s. signal is accentuated, while the 10 c.p.s. signal remains unchanged. The 510 c.p.s. and 10 c.p.s. signals are then passed through high pass or band pass filter 14, wherein the 10 c.p.s. signal is eliminated As disclosed hereinabove in connection with FIGURE 1, the 510 c.p.s. signal from filter 14 is applied to one input terminal of balanced modulator 16. The complex signal to be analyzed, which for purposes of illustration is assumed herein to have a 10 c.p.s. component, is applied to the other input terminal of balanced modulator 16. The output signal from balanced modulator 16 contains the sum frequency of 520 c.p.s., the difference frequency of 500 c.p.s., and the 10 c.p.s. component of the complex wave These frequencies are applied to tuned amplifier or filter 17, tuned to the 500 c.p.s. frequency of the reference oscillator. The output 500 c.p.s. signal from filter 17 is applied to amplitude indicator 18, and to the Y axis input of graphic X—Y recorder 27.

It will be apparent therefore, that in the embodiment of FIGURE 2, as the frequency of variable frequency oscillator 21 is swept, a curve will be drawn on recorder 27 indicating the amplitude and frequency of each component of the complex wave signal applied to terminal 15. The provision of phase splitters 23 and 26, and balanced modulators 24 and 25 associated therewith, enables much simpler construction of filter 14. In the embodiment of FIGURE 1, filter 14 is required to be sharp enough to discriminate between the two sidebands, while in the embodiment of FIGURE 2, it need only discriminate between the upper sideband and the low frequency, 10 c.p.s. in the example, produced by variable frequency oscillator 21. As will be apparent, graphic recorder 27 and sweep control 22 may be employed in connection with the embodiment of FIGURE 1 if desired.

While there has been disclosed hereinabove certain presently preferred embodiments of this invention, it will be understood that various changes and modifications may be made therein without departing from the scope of the invention as defined in the appended claims.

What I claim is:

1. A complex wave analyzer comprising a variable frequency oscillator and a first phase splitter producing a first pair of signals at a first frequency, a fixed frequency reference oscillator and a second phase splitter producing a second pair of signals at a second frequency, a first balanced modulator connected to said first phase splitter and said second phase splitter, a second balanced modulator connected to said first phase splitter and said second phase splitter, a first filter connected to said first and second balanced modulators for producing a third signal having a frequency equal to the sum of said first and second frequencies, a third balanced modulator connected to said first filter and to an input terminal for combining said third signal and a complex wave applied to said input terminal to produce a fourth signal having a frequency equal to the difference between a frequency component of said complex wave and the frequency of said third signal, a second filter connected to said third balanced modulator and tuned to said second frequency for passing said fourth signal, and an indicator connected to said second filter for indicating the amplitude of said fourth signal.

2. A complex wave analyzer comprising a variable frequency oscillator and a first phase splitter producing a first pair of signals in phase quadrature at a first frequency, a fixed frequency reference oscillator and a second phase splitter producing a second pair of signals in phase quadrature at a second frequency, a first balanced modulator connected to said first and second phase splitters, a second balanced modulator connected to said first and second phase splitters, a high pass filter connected to said first and second balanced modulators for producing a third signal having a frequency equal to the sum of said first and second frequencies, a third balanced modulator connected to said high pass filter and to an input terminal for combining said third signal and a complex wave applied to said input terminal to produce a fourth signal having a frequency equal to the difference between a frequency component of said complex wave and the frequency of said third signal, a band pass filter connected to said third balanced modulator and tuned to said second frequency for passing said fourth signal, and an indicator connected to said band pass filter for indicating the amplitude of said fourth signal.

3. A complex wave analyzer comprising a variable frequency oscillator producing a first signal at a first frequency, a fixed frequency reference oscillator producing a second signal at a second frequency, a first balanced modulator connected to said variable frequency oscillator and said fixed frequency reference oscillator, a high pass filter connected to said first balanced modulator for producing a third signal having a frequency equal to the sum of said first and second frequencies, a second balanced modulator connected to said high pass filter and to an input terminal for combining said third signal and a complex wave applied to said input terminal to produce a fourth signal having a frequency equal to the difference between a frequency component of said complex wave and the frequency of said third signal, a band pass filter connected to said second balanced modulator and tuned to said second frequency for passing said fourth signal, and an indicator connected to said band pass filter for indicating the amplitude of said fourth signal, means for varying the frequency of said variable frequency oscillator, and a recorder connected to the output of said band pass filter and to said last named means for recording the frequency and amplitude of the frequency components of said complex wave.

4. A complex wave analyzer comprising a variable frequency oscillator and a first phase splitter producing a first pair of signals in phase quadrature at a first frequency, a fixed frequency reference oscillator and a second phase splitter producing a second pair of signals in phase quadrature at a second frequency, a first balanced modulator connected to said first and second phase splitters, a second balanced modulator connected to said first and second phase splitters, a high pass filter connected to said first and second balanced modulator for producing a third signal having a frequency equal to the sum of said first and second frequencies, a third balanced modulator connected to said high pass filter and to an input terminal for combining said third signal and a complex wave applied to said input terminal to produce a fourth signal having a frequency equal to the difference between a frequency component of said complex wave and the frequency of said third signal, a band pass filter connected to said third balanced modulator and tuned to said second frequency for passing said fourth signal, an indicator connected to said band pass filter for indicating the amplitude of said fourth signal, means for varying the frequency of said variable frequency oscillator and a recorder connected to the output of said band pass filter and to said last named means for recording the frequency and amplitude of the frequency components of said complex wave.

5. A complex wave analyzer comprising a variable frequency signal generator producing a first signal at a first frequency, a reference frequency signal generator producing a second signal at a second frequency, first means connected to said variable frequency signal generator for producing two signals in phase quadrature at said first frequency, second means connected to said reference frequency signal generator for producing two signals in phase quadrature at said second frequency, first modulating means connected to said first and second means and second modulating means connected to said first and second means, means for combining the output of said modulating means and producing a third signal having a frequency equal to the sum of said first and second frequencies, third modulating means connected to an input terminal and responsive to said third signal and to a complex wave applied to said input terminal to produce a fourth signal having a frequency equal to the difference between a frequency component of said complex wave and the frequency of said third signal and equal to said second frequency, a filter tuned to said second frequency and connected to said third modulating means, and an indicator connected to said second frequency filter for indicating the amplitude of said fourth signal.

References Cited in the file of this patent

UNITED STATES PATENTS

| | | |
|---|---|---|
| 2,024,614 | Terry | Dec. 17, 1935 |
| 2,270,023 | Ramsay | Jan. 13, 1942 |
| 2,575,047 | Crosby | Nov. 13, 1951 |
| 2,606,285 | Battaille et al. | Aug. 5, 1952 |
| 2,629,829 | Daly | Feb. 24, 1953 |
| 2,630,285 | Kamphoefner | Mar. 3, 1953 |
| 2,661,458 | Saraga | Dec. 1, 1953 |
| 2,763,836 | Bullock | Sept. 18, 1956 |
| 2,774,037 | Hansel | Dec. 11, 1956 |
| 2,777,953 | Tollefson | Jan. 15, 1957 |
| 2,794,954 | Bischoff | June 4, 1957 |
| 2,798,952 | Cutler | July 9, 1957 |
| 2,927,272 | Gates | Mar. 11, 1960 |

FOREIGN PATENTS

| | | |
|---|---|---|
| 594,674 | Great Britain | Nov. 17, 1947 |
| 622,838 | Great Britain | May 9, 1949 |